3,048,604
DESELENATION OF DEHYDROSTEROIDS CONTAINING SELENIUM

Max Oberlin, Basel, and Hugo Frey, Olten, Switzerland, assignors to Ciba Corporation, a corporation of Delaware
No Drawing. Filed June 28, 1961, Ser. No. 120,162
Claims priority, application Switzerland July 1, 1960
8 Claims. (Cl. 260—397.4)

It is known that the reaction of selenium dioxide upon $\Delta^4$-3-keto-steroids in a tertiary alcohol brings about dehydrogenation to yield the corresponding $\Delta^{1:4}$-dehydro-3-keto-steroids (see Meystre, Frey, Voser and Wettstein, Helv. 39, page 734 [1956]; Szpilfogel, Posthumus, De Winter and Van Dorp, Rec. Trav. Chim. 75, page 475 [1956]). By this reaction there are formed as by-products, and sometimes predominantly, compounds containing selenium (see the above-mentioned references and Florey and Restivo, J. Org. Chem. 22, page 406 [1957]).

While the $\Delta^{1:4}$-deyhro-3-keto-steroids are important and new medicaments (for example $\Delta^1$-dehydro-cortisone, $\Delta^1$-dehydro-hydrocortisone, $\Delta^1$-dehydro-fluorohydrocortisone, $\Delta^1$-dehydro-methyltestosterone), the compounds containing selenium are of no importance to human medicine. In the case, for example, of seleno-$\Delta^{1:4}$-cholestadiene-3-one it is merely stated that this substance has fungicidal action (U.S. Patent 2,917,507, granted December 15, 1959, to Klaus G. Florey, Westfield, N.J.). Thus, the formation of such selenium compounds in the treatment of $\Delta^4$-3-keto-steroids with selenium dioxide in place of the valuable $\Delta^{1:4}$-3-keto-steroids is a loss of costly material. The successful conversion of the selenium compounds into the desired $\Delta^{1:4}$-3-keto-steroids is therefore of great value.

While relevant experiments had already been made in the past, they were unsuccessful. Inter alia, Florey and Restivo (see above literature reference) have been able to carry out "deseleniumizations" by heating for several hours in an organic solvent with Raney nickel or by simply heating the substance in dry condition in vacuo to about 350–370° C. In the case of the aforementioned seleno-$\Delta^{1:4}$-cholestadiene-3-one there were obtained under the first-mentioned conditions small amounts of $\Delta^{1:4}$-cholestadiene-3-one in addition to other products, while in the second case selenium-free crystallisates were obtained, which, however, could not be purified to yield accurately defined substances (see above literature reference). Finally, there may be mentioned also the process of U.S. Patent No. 2,900,398, granted August 18, 1959, to Ciba Pharmaceutical Products, Inc., Summit, N.J., according to which the mother liquor products containing selenium, obtained by the dehydrogenation of steroids saturated in positions 1 and/or 4 with selenium compounds having a dehydrogenating action in the presence of a metal of group II or VIII of the periodic table, for example of mercury, are treated with inactivated Raney nickel or with iron, whereby further amounts of $\Delta^{1:4}$-3-keto-steroids can be isolated from the reaction mixture.

The present invention is based on the observation that the deseleniumization by treating a compound containing selenium, such as is obtained by deyhdrogenating a 3-keto-steroid saturated in position 1 and/or 4 with a selenium compound having dehydrogenating action, such, for example as selenium dioxide, selenious acid or dibenzoyloxy-selenium oxide, with a metal can be achieved in a simple and advantageous manner when copper is used as the metal. This reaction can be carried out with the pure steroid-selenium compound or with a mixture containing this compound and the $\Delta^{1:4}$-3-keto-steroid in any desired proportion, such as is obtained by the afore-mentioned dehydrogenation.

The reaction is carried out in an organic solvent. Particularly suitable are organic acids, preferably lower fatty acids, such, for example, as glacial acetic acid, propionic acid, high-boiling ethers, especially aliphatic ethers such as isoamyl ether, alcohols, more especially aliphatic dihydric alcohols such as ethylene glycol, diethylene glycol, monoether of aliphatic dihydric alcohols with lower aliphatic alcohols such as ethylene glycol monoethyl ether, or mixtures of the aforementioned solvents, if desired with addition of a small amount of a non-oxidizing acid, for example an inorganic acid such as hydrocholric acid. The reaction is carried out at an elevated temperature, preferably between about 100 and 300° C., if desired under superatmospheric pressure and/or in a current of nitrogen.

The following examples illustrate the invention. The selenium compounds used as starting materials, which are formed by the known dehydrogenation of 3-keto-steroids, are referred to as seleno-$\Delta^{1:4}$-3-keto-steroids.

Example 1

1.0 gram of seleno-$\Delta^{1:4}$-cholestadiene-3-one is heated in 3.0 cc. of diethylene glycol with 0.5 gram of finely ground copper to 210–220° C. and maintained at this temperature for about 10 minutes with occasional stirring. During this time the copper turns black and agglomerates; it is cooled, suction-filtered, washed on the filter with a small amount of acetone and the filtrate is evaporated in vacuo to dryness. The residue, which resembles a lacquer, it taken up in benzene and the solution is chromatographed on alumina, to yield 450 mg. of $\Delta^{1:4}$-cholestadiene-3-one which melts at 109° to 111° C. after having been recrystallized from methanol. Optical rotation $[\alpha]_D^{20°} = +28.5$ (c.=1, in chloroform). The product is free from selenium and is identical with the $\Delta^{1:4}$-cholestadiene-3-one described by Florey and Restivo in J. Org. Chem. 22, page 409 [1957].

Example 2

200 mg. of seleno-$\Delta^{1:4}$-cholestadiene-3-one are refluxed with stirring for 7–8 hours in 0.6 cc. of glacial acetic acid with 100 mg. of finely ground copper, during which the copper turns dark brown to black. Working up as described in Example 1 yields 60 mg. of $\Delta^{1:4}$-cholestadiene-3-one which is identical with the product obtained in Example 1.

Example 3

200 mg. of seleno-$\Delta^{1:4}$-cholestadiene-3-one are boiled with stirring in 0.6 cc. of diisoamyl ether in the presence of 20 mg. of glacial acetic acid with 100 mg. of finely ground copper. After about 13 minutes the copper has turned black and agglomerated. Working up as described in Examples 1 and 2 yields 50 mg. of $\Delta^{1:4}$-cholestadiene-3-one having the aforementioned properties.

Example 4

5.0 grams of seleno-$\Delta^1$-dehydro-testosterone propionate are heated in 15 cc. of diethyleneglycol with 2.5 grams of finely ground copper to 210–220° C. and stirred at this temperature for about 6 minutes, during which the copper turns black and agglomerates. Working up as described above yields 1.95 grams of $\Delta^1$-dehydro-testosterone propionate which, after having been recrystallized from ethyl acetate, melts at 138–140° C. as does the product described by Inhoffen, Zuhlsdorff and Huang Minlon (B. 73, page 456 [1940]). The crystals are free from selenium.

Example 5

A mixture of 1.0 gram of seleno-$\Delta^1$-dehydro-17α-methyl-testosterone, 3.0 cc. of diethylene glycol and 0.5 gram of finely ground copper is heated under nitrogen with stirring to 210–220° C. and kept at this temperature for 10 minutes, whereupon the copper powder turns black. The whole is allowed to cool, suction-filtered, washed on the filter with a small amount of methanol and the product is precipitated by pouring the reaction mixture into water. The tacky precipitate is taken up in toluene, the toluene solution is dried over sodium sulfate, chromatographed on alumina and after recrystallization from ethyl acetate there is obtained 0.6 gram of $\Delta^1$-dehydro17α-methyl-testosterone melting at 162–165° C. Optical rotation $[\alpha]_D^{20°}=+12.5°$ (c.=1 in ethanol). The product is identical with the substance obtained by Meystre, Frey, Voser and Wettstein (Helv. 39, page 741 [1956]).

*Example 6*

A mixture of 1.0 gram of seleno-$\Delta^1$-dehydro-17α-methyl-testosterone, 3.0 cc. of glacial acetic acid and 500 mg. of finely ground copper is stirred under nitrogen for 20 hours at 110–115° C. Working up as described in the preceding examples yield 160 mg. of $\Delta^1$-dehydro-17α-methyl-testosterone which, after recrystallization from ethyl acetate, melts at 162–165° C. and is identical with the product described in Example 5.

*Example 7*

A mixture of 1.0 gram of seleno-$\Delta^1$-dehydro-17α-methyl-testosterone, 0.5 gram of finely ground copper and 3.0 cc. of diethylene glycol is heated with stirring for 8 hours at 160° C., suction-filtered, washed with a small amount of acetone and poured into water. The product is taken up in ethyl acetate, the solution is washed with water and evaporated to dryness. The residue is dissolved in benzene and the benzene solution is chromatographed on alumina. Recrystallization from ethyl acetate yields 580 mg. of $\Delta^1$-dehydro-17α-methyl-testosterone having the properties described in Example 5.

*Example 8*

A mixture of 2 grams of seleno-$\Delta^1$-dehydro-17α-methyl-testosterone, 1 gram of finely ground copper and 6 cc. of ethylene-glycol monoethyl ether is refluxed with stirring under nitrogen for 48 hours. Working up as described in the preceding examples yields 600 mg. of $\Delta^1$-dehydro-17α-methyl-testosterone having the properties described in Example 5.

*Example 9*

A mixture of 750 mg. of $\Delta^1$-dehydro-17α-methyl-testosterone and 200 mg. of seleno-$\Delta^1$-dehydro-17α-methyl-testosterone in 2 cc. of diethyleneglycol is heated with 300 mg. of finely ground copper for 12 hours at 165° C. while stirring and passing a weak current of nitrogen, then allowed to cool, diluted with a small amount of acetone, suctioned off and washed on the filter with acetone. The bulk of the acetone is distilled off and the residue is dissolved in toluene. The toluene solution is repeatedly washed with water, dried, stirred with a small amount of alumina, and the whole is then chromatographed on alumina. Recrystallization of the eluate from ethyl ester yields 800 mg. of $\Delta^1$-dehydro-17α-methyl-testosterone having the properties described in Example 5.

The mixture used above as starting material can be prepared for example as follows:

A solution of 5 grams of 17α-methyl-testosterone in 85 cc. of amylene hydrate is treated with 2.5 cc. of glacial acetic acid. The mixture is heated to the boil under reflux and in the course of 18 hours 1.5 grams of selenium dioxide are added in portions, whereupon the mixture is heated for another 6 hours at the boil, allowed to cool, the reaction mixture is treated with ethyl acetate, any residual selenium dioxide is reduced by agitation with sodium thiosulfate solution and the precipitated selenium is suctioned off. The filtered ethyl acetate/amylene hydrate solution is washed with sodium carbonate solution and water and finally treated with active carbon. Evaporation in vacuo yields about 5 grams of a substantially crystalline yellowish brown residue which constitutes the mixture used above as starting material.

What is claimed is:

1. Process for the manufacture of $\Delta^{1,4}$-dehydro-steroids by deselenation of a compound obtained by dehydrogenation of a 3-keto-steroid saturated at least in one of the positions 1:2 and 4:5 with a selenium compound having a dehydrogenating action, with a metal in the presence of an organic solvent, wherein copper is used as the metal.

2. Process as claimed in claim 1, wherein the treatment with copper is performed in an organic solvent selected from the group consisting of lower fatty acids, high boiling aliphatic ethers, aliphatic dihydric alcohols, monoether of aliphatic dihydric alcohols with lower aliphatic alcohols and mixtures thereof.

3. Process as claimed in claim 2, wherein glacial acetic acid is used as solvent.

4. Process as claimed in claim 2, wherein di-isoamyl-ether is used as solvent.

5. Process as claimed in claim 2, wherein diethylene glycol is used as solvent.

6. Process as claimed in claim 1, wherein seleno-$\Delta^1$-dehydro-17α-methyl-testosterone is used as starting material.

7. Process as claimed in claim 1, wherein a mixture of $\Delta^{1,4}$-3-keto steroid and the corresponding selenium compound obtained in the course of the dehydrogenation of a 3-keto-teroid saturated at least in one of the positions 1:2 and 4:5 with selenium dioxide is used as starting material.

8. Process as claimed in claim 7, wherein the mixture of $\Delta^1$-dehydro-17α-methyl-testosterone and seleno-$\Delta^1$-dehydro-17α-methyl-testosterone obtained in the course of the dehydrogenation of 17α-methyl-testosterone by means of selenium dioxide is used as starting material.

References Cited in the file of this patent

UNITED STATES PATENTS 2,900,398    Wettstein et al. _____ Aug. 18, 1959